June 28, 1949.  H. D. SCHWARZBAUM  2,474,804
ANTITIPPING DEVICE FOR BABY CARRIAGES
Filed Feb. 18, 1947  2 Sheets-Sheet 1
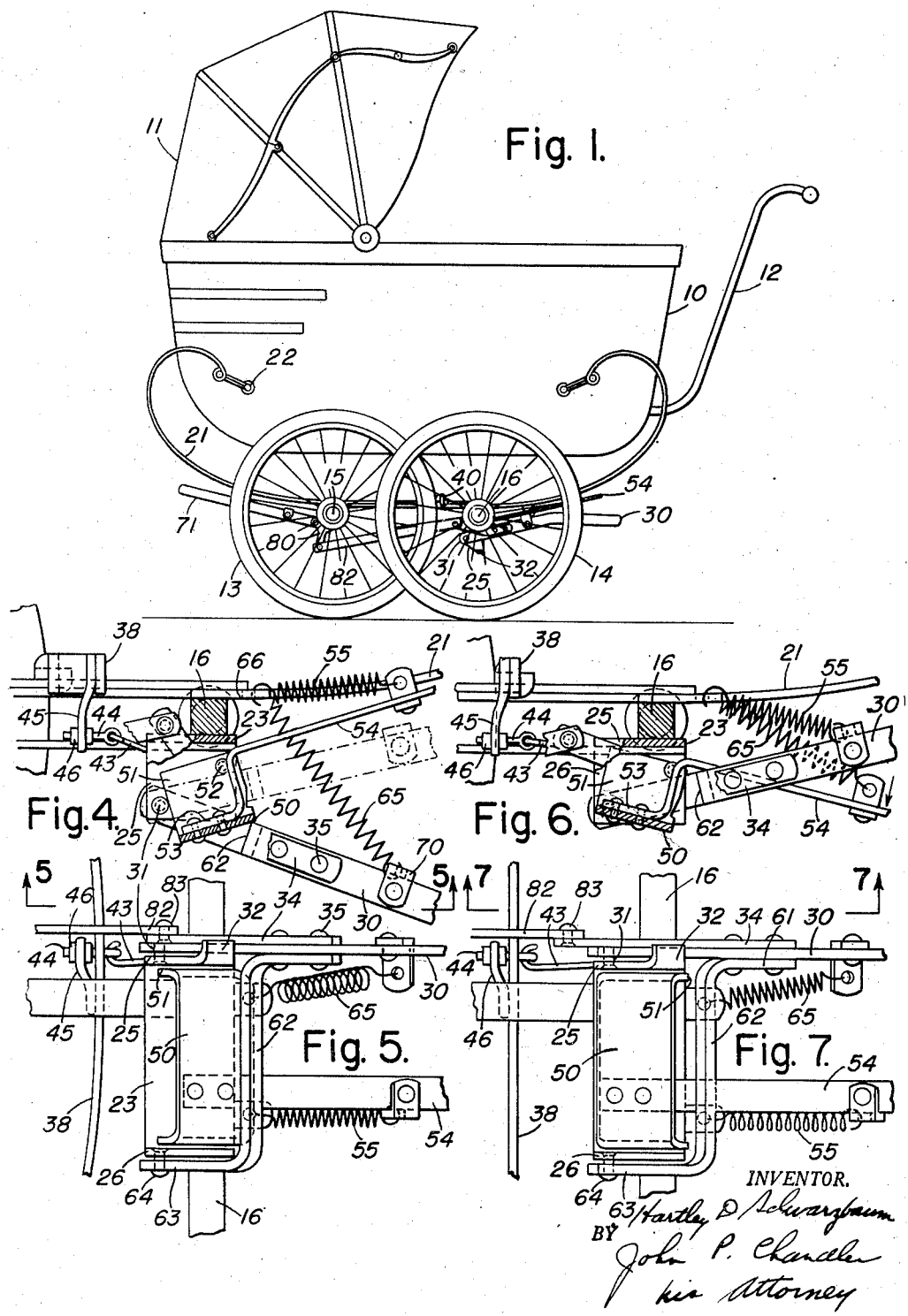

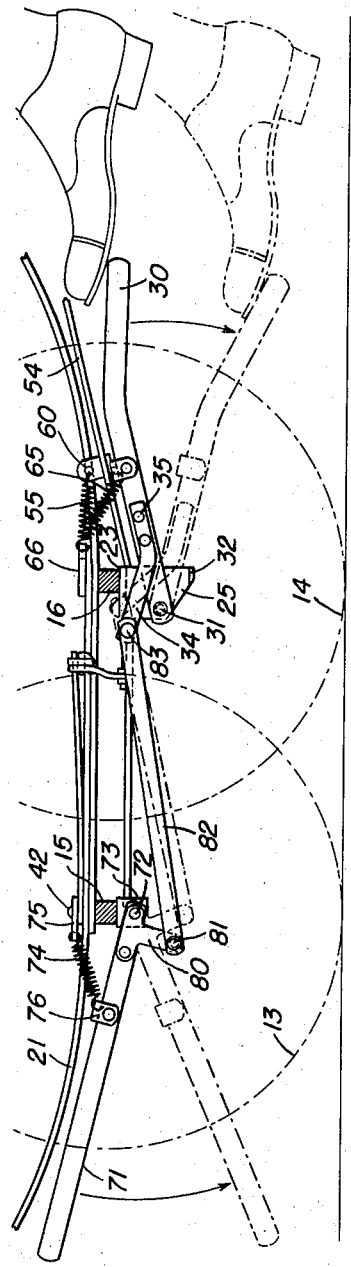

Patented June 28, 1949

2,474,804

UNITED STATES PATENT OFFICE 2,474,804

ANTITIPPING DEVICE FOR BABY CARRIAGES

Hartley D. Schwarzbaum, New York, N. Y., assignor to Bilt-Rite Baby Carriage Co., Inc., Brooklyn, N. Y., a corporation of New York Application February 18, 1947, Serial No. 729,343

3 Claims. (Cl. 280—47)

This invention relates to baby carriages, and relates more particularly to a novel anti-tipping device arranged to prevent tipping of the carriage at either end thereof.

Anti-tipping devices are known and are frequently employed in connection with baby carriages of the type which are provided with large wheels. The danger of the child tipping the carriage is greater in carriages of this kind than in carriages fitted with relatively small wheels, primarily because of the shorter wheel base. These devices generally comprise a pivoted arm associated with the front end of the carriage, i. e., the end at which the pusher handle is fitted. This arm is usually connected with the brake mechanism, and when the brake is applied the arm is lowered to a point adjacent the ground.

An important object of the present invention is to provide a novel structure having an anti-tipping lever at the rear end as well as at the forward end of the carriage, both of which are arranged to be simultaneously lowered to anti-tipping position as the brake is applied. Another object of the invention is to provide means for securely locking the parts in operative position when desired. A further object of the invention is to provide anti-tipping means for baby carriages which will not interfere with free rotation of the wheels when the brakes are released.

Yet another object of the invention is to provide means comprising anti-tipping arms at each end of a baby carriage, either of which may be employed for operating the carriage brakes. The importance of this arrangement from the standpoint both of safety and of convenience to the one in charge of the carriage will be well appreciated. Carriages or coaches of this type have the usual pivoted hood which is generally open toward the front of the carriage. If desired, however, it may be opened toward the rear of the carriage, and the present invention provides a combined anti-tipping arm and brake-actuating lever at such rear end of the carriage.

In the drawings:

Fig. 1 is a side elevation of a baby carriage embodying the anti-tipping device of the present invention.

Fig. 2 is an enlarged detail view, partially in section, of the operative parts of the present invention, the section being taken on line 2—2 of Fig. 3.

Fig. 3 is a top plan view of the mechanism illustrated in Fig. 2.

Fig. 4 is a broken longitudinal section taken through the mechanism associated with the rear shaft.

Fig. 5 is a bottom plan view of the structure shown in Fig. 4.

Fig. 6 is similar to Fig. 4, but shows the parts in released position.

Fig. 7 is similar to Fig. 5, but also shows the parts in released position.

In Fig. 1 there is illustrated a conventional baby carriage having a coach body 10, a hood 11, handle 12, and wheels 13 and 14. The wheels are mounted on shafts 15 and 16 which are secured, as by means of rivets 20, to longitudinally-disposed springs 21 which provide spaced frame elements and which curve upwardly at their terminals and support the coach body, as at 22. All of the foregoing structure is conventional, and is to be found in most carriages of this type.

A bracket 23, preferably made from relatively heavy sheet metal, is secured to shaft 16 by means of rivets 24, such bracket having downwardly-extending flanges 25 and 26 at opposite ends thereof, thus forming an inverted, substantially U shaped structure which is rigidly carried by shaft 16. An anti-tipping arm or lever 30 at the front of the carriage is pivotally mounted on flange 25, as shown at 31. An outward extension 32 of flange 25 limits downward movement of lever 30. This lever may be substantially straight, or it may have a slight bend substantially in the center, as shown. This lever normally occupies its uppermost position shown in full lines in Figs. 1 and 2. When it is desired, however, to actuate the brakes and to move both anti-tipping levers downwardly, such lever 30 is moved downwardly with the foot, as shown in Figs. 2 and 3.

Another lever or crank member 34 rigidly secured to lever 30 by means of rivets 35 projects forwardly and upwardly of pivot 31, and when such lever 30 is moved downwardly it also actuates the brake means by the following mechanism. The brake mechanism includes the usual transverse brake bar 38 which is made from a strip of metal rectangular in cross-section and having a considerable bending moment, the central portion of the strip occupying a vertical position. Adjacent its terminals the strip is bent at right angles, as shown at 36. Such portion is pivotally secured by means of rivets 37 to spring frame elements 21. The terminals 40 of the brake bar are also vertical. For the purpose of strengthening the frame structure generally, braces 41 are secured, as by means of a rivet 42, to rear shaft 15, and the opposite ends of such braces are secured to rivets 37.

Connection between lever 34 and brake bar 35 is effected by means of a link 43 which is secured at one end thereof to such lever 34, and at its opposite end is secured to an eye bolt 44 which passes through a downwardly-extending bracket 45 secured generally centrally of brake bar 38. Adjustment of bolt 44 relative to bracket 45 is effected by means of nuts 46 carried on opposite sides of bracket 45. It will thus be seen that when lever 30 is depressed, the outer end of lever 34 moves forwardly and flexes brake bar 38 to the position shown in broken lines in Fig. 3. This causes the outer terminals 40 to move rearwardly and thus engage rear wheels 13.

The following means are provided for retaining anti-tipping lever 30 in lowered position, and for releasing the same when desired. A substantially U shaped bracket 50 having a central portion, and upwardly-extending flanges 51 at opposite ends thereof, is pivotally mounted, as shown at 52, to downwardly-extending flanges 24 and 25. Attached to the upper surface of such bracket 50 is the inner terminal 53 of a release lever 54. This lever is urged in a counter-clockwise direction, when viewed as in Fig. 2, by means of a spring 55 which is secured at one end thereof to a plate 56 carried by front shaft 16. The other end of spring 55 is secured to a plate 60 carried by such release lever 54.

An angular bracket 62 having a terminal portion 61 is secured to lever 30 by means of the same rivets 35 that secure lever 34 thereto. This bracket has an intermediate portion which extends transversely of the carriage, and an opposite terminal portion 63 which is pivotally secured at 64 to flange 26. Pivot 64 is aligned with pivot 31 on the opposite side of the fixed bracket 23. Thus, when lever 30 is depressed, bracket 62 moves through a similar arc. This downward movement of the lever causes such bracket to have a wiping action over the central portion of the bracket 50, and when the central portion of bracket 62 moves downwardly to a point wherein it underlies bracket 50, spring 55 causes lever 54 and bracket 50 to rotate slightly through an arc to the position shown in Fig. 4, thus locking lever 30 in its lowered position.

To release lever or arm 30, release lever 54 is depressed, which causes bracket 50 to move clockwise through a sufficient arc to release bracket 62 and arm 30. It will be noted that arm 30 is urged in a counter-clockwise direction, when viewed as in Fig. 2, by means of a spring 65 which is secured at one end thereof to a plate 66 mounted on shaft 16, and at the other end to an angle bracket 70 carried by such lever 30.

Anti-tipping arm 71 at the rear of the carriage is pivotally mounted at 72 on an angle bracket 73 secured to the lower surface of rear axle 15. A spring 74 urges such arm in a clockwise direction, the spring being secured at one end thereof to a plate 75 mounted on the upper surface of such axle by means of rivet 42. The other end of the spring is secured to an angle bracket 76 carried by lever 71. A T shaped bracket 80 which forms, in effect, a bell-crank lever in combination with arm 71, is secured to such arm adjacent its inner terminal. Secured at the outer end of such T shaped bracket at 81 is a link 82. The opposite end of such link is pivotally secured at 83 to the upper end of lever 34 carried by front anti-tipping arm 30.

While one form or embodiment of the invention has been shown and described herein for illustrative purposes, and the construction and arrangement incidental to a specific application thereof have been disclosed and discussed in detail, it is to be understood that the invention is limited neither to the mere details or relative arrangement of parts, nor to its specific embodiment shown herein, but that extensive deviations from the illustrated form or embodiment of the invention may be made without departing from the principles thereof.

What I claim is:

1. In a baby carriage provided with a frame, front and rear axles, wheels carried at the ends of said axles, and a brake for the wheels, the combination of a pivoted arm carried by the front axle and extending forwardly therefrom, and a similar arm carried by the rear axle and extending rearwardly therefrom, the outer ends of each of said arms being arranged to be conjointly moved from an elevated position through a relatively short arc to a downward position and to be locked in such latter position to prevent tipping of the carriage, a crank member rigidly secured to the rear arm adjacent its pivot and extending downwardly therefrom, a crank member rigidly secured to the front arm adjacent its pivot and extending upwardly therefrom, a link connecting the outer ends of each of said crank members to produce downward movement of one arm when the other is depressed, a lock for retaining the arms in such downward position, and a depressible lever associated with the front axle for releasing said lock.

2. In a baby carriage provided with a frame including front and rear axles, wheels carried at the ends of said axles, and a brake for the wheels, the combination of a pivoted arm carried at the front of the carriage and extending forwardly of the front axle, and a similar arm carried at the rear of the carriage and extending rearwardly of the rear axle, the outer ends of each of said arms being arranged to be conjointly moved from an elevated position through a relatively short arc to a downward position and to be locked in such latter position to prevent tipping of the carriage, a crank member rigidly secured to one of such arms and extending downwardly generally radially of its axis, a crank member rigidly secured to the other arm and extending upwardly therefrom generally radially of its pivot, a link connecting the outer ends of each of said crank members to produce downward movement of one arm when the other is depressed, a lock for retaining the arms in such lowered position, and a depressible lever carried at the front of the carriage for releasing said lock.

3. In a baby carriage provided with a frame, front and rear axles, wheels carried at the ends of said axles, and a brake for the wheels, the combination of a pivoted arm carried by the front axle and extending forwardly therefrom, and a similar arm carried by the rear axle and extending rearwardly therefrom, the lengths of such arms being greater than the distance between their axes and the plane of the lower surfaces of the wheels, the outer ends of each of said arms being arranged to be conjointly moved from an elevated position through an arc of less than 90° to a downward position and to be locked in such latter position to prevent tipping of the carriage, a crank member rigidly secured to one of such arms adjacent its pivot and extending downwardly therefrom, a crank member rigidly secured to the other arm adjacent its pivot and extending upwardly therefrom, a link connecting the outer ends of each of said crank members to produce downward movement of one arm when the other is depressed, a lock for retaining the arms in such lowered position, and a pivoted, depressible lever for releasing said lock.

HARTLEY D. SCHWARZBAUM.

REFERENCES CITED

The following references are of record in the file of this patent:

UNITED STATES PATENTS

| Number | Name | Date |
| --- | --- | --- |
| 2,014,085 | Kroll et al. | Sept. 10, 1935 |
| 2,249,860 | Sheldrick | July 22, 1941 |